US011142326B2

(12) United States Patent
Thomas et al.

(10) Patent No.: US 11,142,326 B2
(45) Date of Patent: Oct. 12, 2021

(54) MECHANISM FOR INDICATING POSITION OF A LATCH MECHANISM FOR AN AIRCRAFT NACELLE

(71) Applicant: The Boeing Company, Chicago, IL (US)

(72) Inventors: Kyle A. Thomas, Bellevue, WA (US); Rhoda Rebecca Toliver, Summerville, SC (US); Michael Roethle, North Charleston, SC (US); Matthew Joseph Woerly, Renton, WA (US); Matthew Senesac, Charleston, SC (US); Kushy Sachdeva, Renton, WA (US)

(73) Assignee: The Boeing Company, Chicago, IL (US)

( * ) Notice: Subject to any disclaimer, the term of this patent is extended or adjusted under 35 U.S.C. 154(b) by 709 days.

(21) Appl. No.: 16/047,465

(22) Filed: Jul. 27, 2018

(65) Prior Publication Data

US 2020/0031484 A1 Jan. 30, 2020

(51) Int. Cl.
*B64D 29/06* (2006.01)
*E05B 79/20* (2014.01)
(Continued)

(52) U.S. Cl.
CPC .............. *B64D 29/06* (2013.01); *E05B 79/20* (2013.01); *B64D 29/08* (2013.01); *E05B 83/00* (2013.01);
(Continued)

(58) Field of Classification Search
CPC ......... B64C 1/1446; B64C 7/02; B64D 29/06; B64D 29/08; B64D 45/0005; E05B 41/00;
(Continued)

(56) References Cited

U.S. PATENT DOCUMENTS 3,194,595 A * 7/1965 Wheeler .................. E05B 41/00
292/113
4,040,652 A * 8/1977 Arfelt ...................... E05B 41/00
292/167
(Continued)

FOREIGN PATENT DOCUMENTS

EP 1091059 A2 4/2001

OTHER PUBLICATIONS

Federal Aviation Administration, Separation of the Engine-Fan Cowl on Certain Aircraft During Flight, InFO 09013, Jul. 13, 2009, https://www.faa.gov/other_visit/aviation_industry/airline_operators/airline_safety/info/all_infos/media/2009/inFO09013.pdf.
(Continued)

*Primary Examiner* — Medhat Badawi

(57) ABSTRACT

An aircraft nacelle is disclosed and includes a first fan cowl and a second fan cowl. An opening is defined in an exterior surface of the first fan cowl. The aircraft nacelle also includes a blade, a latch mechanism, an arm, and a linkage assembly operably connecting the arm to the blade. The blade is moveable along between a stowed position and a deployed position. The latch mechanism is moveable between a latched position an unlatched position where a portion of the latch mechanism obstructs a path of movement of the blade. The arm is unable to move from an extended position where a portion of the arm extends through the opening in the exterior surface of the aircraft nacelle into a retracted position within an interior volume of the aircraft nacelle when the blade is in the deployed position and the latch mechanism is in the unlatched position.

23 Claims, 10 Drawing Sheets

(51) Int. Cl.
 *B64D 29/08* (2006.01)
 *E05B 83/00* (2014.01)
 *F01D 25/24* (2006.01)
(52) U.S. Cl.
 CPC ......... *E05Y 2900/502* (2013.01); *F01D 25/24* (2013.01); *F05D 2240/14* (2013.01); *F05D 2260/50* (2013.01); *F16C 2350/52* (2013.01)
(58) Field of Classification Search
 CPC ... E05B 79/20; E05B 83/00; E05Y 2900/502; F05D 2240/14; F05D 2260/50; F16C 2350/52
 See application file for complete search history.

(56) References Cited

U.S. PATENT DOCUMENTS

| | | | | |
|---|---|---|---|---|
| 4,150,802 A * | 4/1979 | Evelyn | | B64D 29/00 244/54 |
| 4,365,775 A * | 12/1982 | Glancy | | B64D 29/06 244/129.4 |
| 4,428,609 A * | 1/1984 | Baehr | | B64D 29/06 292/251 |
| 4,531,769 A * | 7/1985 | Glancy | | E05C 19/14 292/113 |
| 4,613,099 A * | 9/1986 | Smith | | B64D 29/06 244/129.4 |
| 4,679,750 A * | 7/1987 | Burhans | | B64D 29/06 244/129.4 |
| 5,518,206 A * | 5/1996 | Arnold | | B64D 29/06 244/129.4 |
| 5,915,765 A * | 6/1999 | Sternberger | | B64D 29/06 24/270 |
| 6,042,156 A * | 3/2000 | Jackson | | B64D 29/06 292/247 |
| 6,148,607 A * | 11/2000 | Baudu | | B64D 29/06 239/265.17 |
| 6,220,546 B1 * | 4/2001 | Klamka | | B64D 29/00 244/129.4 |
| 6,279,971 B1 * | 8/2001 | Dessenberger, Jr. | ... | E05B 41/00 244/129.4 |
| 6,382,690 B1 * | 5/2002 | Dessenberger, Jr. | ... | E05B 41/00 292/113 |
| 6,824,175 B2 * | 11/2004 | Porte | | B64D 29/06 244/129.4 |
| 7,040,578 B2 * | 5/2006 | Halin | | B64D 29/06 244/129.4 |
| 7,293,524 B2 * | 11/2007 | Darby | | F16D 41/12 116/281 |
| 7,802,826 B2 * | 9/2010 | Schmitz | | E05C 3/162 292/216 |
| 8,191,822 B2 * | 6/2012 | Gallego Pleite | | B64D 29/06 244/53 R |
| 8,356,844 B2 * | 1/2013 | Baic | | E05B 65/006 292/205 |
| 8,573,934 B2 * | 11/2013 | Soulier | | B64D 29/06 415/214.1 |
| 9,004,855 B2 * | 4/2015 | Vauchel | | B64D 29/06 415/126 |
| 9,246,272 B2 * | 1/2016 | Kitchen | | H01R 13/629 |
| 9,289,634 B2 * | 3/2016 | Chabod | | A62B 1/14 |
| 9,353,559 B2 * | 5/2016 | Fabre | | F02C 7/20 |
| 9,416,569 B1 * | 8/2016 | Leone | | E05C 5/02 |
| 9,435,141 B2 * | 9/2016 | Tien | | E05B 41/00 |
| 9,701,413 B2 * | 7/2017 | Provost | | E05B 41/00 |
| 9,856,034 B2 * | 1/2018 | Marche | | B64D 45/0005 |
| 9,945,150 B2 * | 4/2018 | Aten | | B64D 29/06 |
| 10,479,516 B2 * | 11/2019 | Oonishi | | B64C 7/02 |
| 2004/0104583 A1 * | 6/2004 | Porte | | B64D 45/0005 292/229 |
| 2011/0142608 A1 * | 6/2011 | Derenes | | B64D 29/08 415/201 |
| 2014/0030079 A1 * | 1/2014 | Provost | | B64D 29/06 415/201 |
| 2014/0225380 A1 * | 8/2014 | Gonidec | | E05C 19/12 292/129 |
| 2015/0021928 A1 * | 1/2015 | Garc A De La Torre | | E05B 41/00 292/137 |
| 2015/0191257 A1 * | 7/2015 | Marche | | F01D 25/24 415/118 |
| 2016/0280383 A1 * | 9/2016 | Lee | | B64D 29/06 |
| 2016/0340024 A1 * | 11/2016 | Pautis | | B64D 29/08 |
| 2017/0240287 A1 * | 8/2017 | Oonishi | | B64D 27/18 |
| 2018/0171664 A1 * | 6/2018 | Frommer | | F04D 27/001 |
| 2019/0127075 A1 * | 5/2019 | Fleming | | B64D 45/0005 |

OTHER PUBLICATIONS

EPO, Extended European Search Report; dated Nov. 14, 2019; pp. 1-9.

\* cited by examiner

| Position # | Latch Mechanism 50 | Blade 64 | Arm 110 | Door 90 |
|---|---|---|---|---|
| 1 | Latched Position | Stowed Position | Retracted Position | Closed Position |
| 2 | Latched Position | Deployed Position; but Able to Rotate Back into the Stowed Position | Extended Position; but an Operator May Urge the Arm Back into the Retracted Position | Open Position; Unable to Rotate Back into the Closed Position |
| 3 | Unlatched Position | Deployed Position; but Unable to Rotate Back into the Stowed Position | Extended Position; but an Operator is Unable to Urge the Arm Back into the Retracted Position | Open Position; Unable to Rotate Back into the Closed Position |

FIG. 11

MECHANISM FOR INDICATING POSITION OF A LATCH MECHANISM FOR AN AIRCRAFT NACELLE

The present disclosure relates to an aircraft nacelle, and more particularly towards a system and method of using a mechanism to confirm a latch mechanism has secured a first fan cowl and a second fan cowl of the aircraft nacelle to one another.

BACKGROUND

A turbofan engine, which may also be referred to as a jet engine, is commonly used to propel an aircraft. A nacelle is an enclosure or housing that is separate from the fuselage of the aircraft that contains the turbofan engine. The nacelle also houses other components associated with operation of the turbofan engine such as, but not limited to, an electric generator driven by the turbofan engine. The nacelle may include left and right fan cowls that each rotate about respective hinges. The fan cowls are secured to one another before operation of the turbofan engines (i.e., before takeoff of the aircraft). However, during maintenance of the turbofan engine both fan cowls may be unsecured from one another and rotated about their respective hinges in an upward direction to provide access to the turbofan engine and other components contained within the nacelle.

The fan cowls may be secured to one other by one or more latches. The latch is often located along the underside of nacelle. If the latch is not engaged, then the fan cowls are not secured to one another and are free to rotate about their respective hinges. In other words, the both the left and right fan cowls may be lowered about their respective hinges such that the nacelle appears to be closed, however, the fan cowls are unsecured to one another. Aircraft personnel such as mechanics and pilots usually perform a walk-around of the aircraft prior to takeoff to inspect the aircraft. However, it may be challenging for aircraft personnel to confirm that the latches are engaged during visual inspection, since the latches are located along the underside of the nacelle and have limited visibility.

Some proposed solutions that attempt to improve or enhance the visibility of the latches exist, however these solutions may be relatively complicated or have other drawbacks. One solution involves painting the latches a bright color to enhance their visibility. For example, the latches may be painted bright orange and the handle length of the latches may be increased to increase visibility underneath a nacelle. However, aircraft personnel may still need to squat or crouch down to view the underside of the nacelle and visually inspect the latches.

SUMMARY

According to several aspects, an aircraft nacelle defining an interior volume and an exterior surface is disclosed. The aircraft nacelle includes a first fan cowl rotatable about a first axis and a second fan cowl rotatable about a second axis. An opening is defined in the exterior surface of the first fan cowl. A blade is located along the exterior surface of the aircraft nacelle on the first fan cowl and is moveable along a path of movement between a stowed position and a deployed position. A latch mechanism is moveable between a latched position where the first fan cowl and the second fan cowl are secured to one another and an unlatched position. A portion of the latch mechanism obstructs the path of movement of the blade. An arm is moveable between a stowed position where the arm is positioned within the interior volume of the aircraft nacelle and an extended position where a portion of the arm extends through the opening in the exterior surface of the aircraft nacelle. A linkage assembly operably connects the arm to the blade. The arm is unable to move from the extended position into the retracted position when the blade is in the deployed position and the latch mechanism is in the unlatched position.

In an additional aspect of the present disclosure, A method for actuating a latch mechanism of an aircraft nacelle is disclosed. The method includes urging an arm from a retracted position where the arm is positioned within an interior volume of the aircraft nacelle into an extended position. A portion of the arm obstructs an opening in an exterior surface of the aircraft nacelle. The method further includes rotating a blade located along the exterior surface of the aircraft nacelle from a stowed position to a deployed position. The blade is operatively connected to the arm and is rotated into the deployed position as the arm is pulled from the retracted position into the extended position. The method also includes releasing the latch mechanism from a latched position into an unlatched position. A first fan cowl and a second fan cowl of the aircraft nacelle are rotatable about respective axes when the latch mechanism is in the unlatched position. Finally, the method includes preventing the blade from rotating back into the stowed position, where a portion of the latch mechanism obstructs the path of movement of the blade.

In another aspect of the present disclosure, a method of rotating a door located along an exterior surface of a nacelle into a closed position to verify a latch mechanism is engaged is disclosed. The method includes moving the latch mechanism from an unlatched position into a latched position. The method further includes urging an arm from an extended position into a retracted position within an interior volume of the aircraft nacelle. A portion of the arm extends through an opening in the exterior surface of the aircraft nacelle when the arm is in the extended position and prevents the door from rotating into the closed position. The method further includes rotating a blade from a deployed position into a stowed position. The blade is operatively connected to the arm and a portion of the latch mechanism obstructs a path of movement of the blade when in the unlatched position. Finally, the method includes rotating the door from an open position into the closed position. The opening in the exterior surface of the aircraft nacelle is concealed when the door is in the closed position.

The features, functions, and advantages that have been discussed may be achieved independently in various embodiments or may be combined in other embodiments further details of which can be seen with reference to the following description and drawings.

BRIEF DESCRIPTION OF THE DRAWINGS

The drawings described herein are for illustration purposes only and are not intended to limit the scope of the present disclosure in any way.

FIG. 11 is a chart listing the possible positions for the latch mechanism, the blade, the arm, and the door according to an exemplary embodiment;

DETAILED DESCRIPTION

The disclosure is directed towards an aircraft nacelle including a latch mechanism for securing a first fan cowl and a second fan cowl together and a mechanism for indicating the latch mechanism has secured the fan cowls to one another. The mechanism is positioned on the aircraft nacelle at an eye level. Thus, an individual does not need to stoop or bend down underneath the aircraft nacelle to view the latch mechanism to confirm the fan cowls are secured to one another. The mechanism for indicating the latch mechanism is secure includes a door and an arm. When the door rotates into a closed position, an opening in the exterior surface of the nacelle is concealed. When the fan cowls are not secured to one another by the latch mechanism, a portion of the arm obstructs the opening in the exterior surface of the aircraft nacelle. Also, an operator is unable to push or otherwise urge the arm away from the opening and into an interior volume of the aircraft nacelle when the fan cowls are not secured. Accordingly, an operator is unable to close the door when the fan cowls are not secured to one another, as the arm obstructs the opening in the exterior surface.

The following description is merely exemplary in nature and is not intended to limit the present disclosure, application, or uses.

Figure 1:
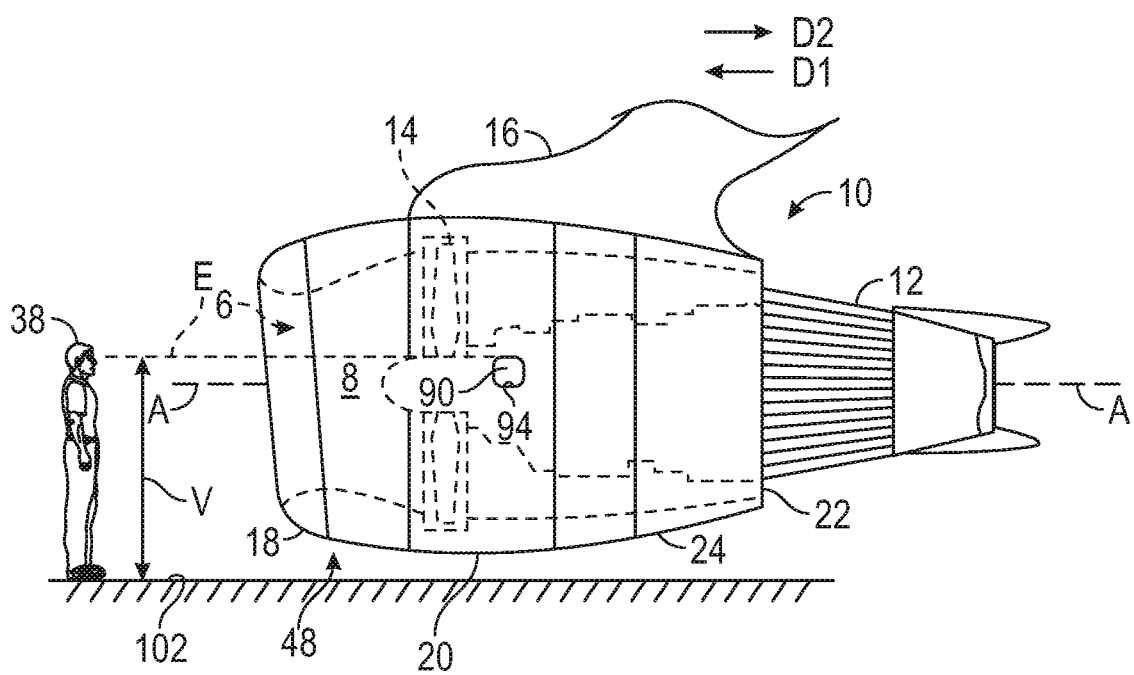
FIG. 1 is a side view of an aircraft nacelle containing a turbofan engine according to an exemplary embodiment.

Referring to FIG. 1, an aircraft nacelle 10 defining an interior volume 6 and an exterior surface 8 is illustrated. The interior volume 6 of the aircraft nacelle 10 is shaped to contain a turbofan engine 12 having a turbofan 14. The aircraft nacelle 10 includes an inlet cowl 18, a fan cowl 20, and a thrust reverser 22. The inlet cowl 18 is positioned towards a forward direction D1 relative to an aircraft (not shown) and the thrust reverser 22 is positioned towards an aft direction D2 of the aircraft. The fan cowl 20 is positioned between the inlet cowl 18 and the thrust reverser 22. The thrust reverser 22 includes a moveable portion 24 configured to translate in the aft direction D2 of the aircraft. The aircraft nacelle 10 and the turbofan engine 12 are connected to the aircraft by a strut or pylon 16. The inlet cowl 18 is mounted to the turbofan engine 12, and the fan cowl 20 and thrust reverser 22 are mounted to the pylon 16.

Figure 2:
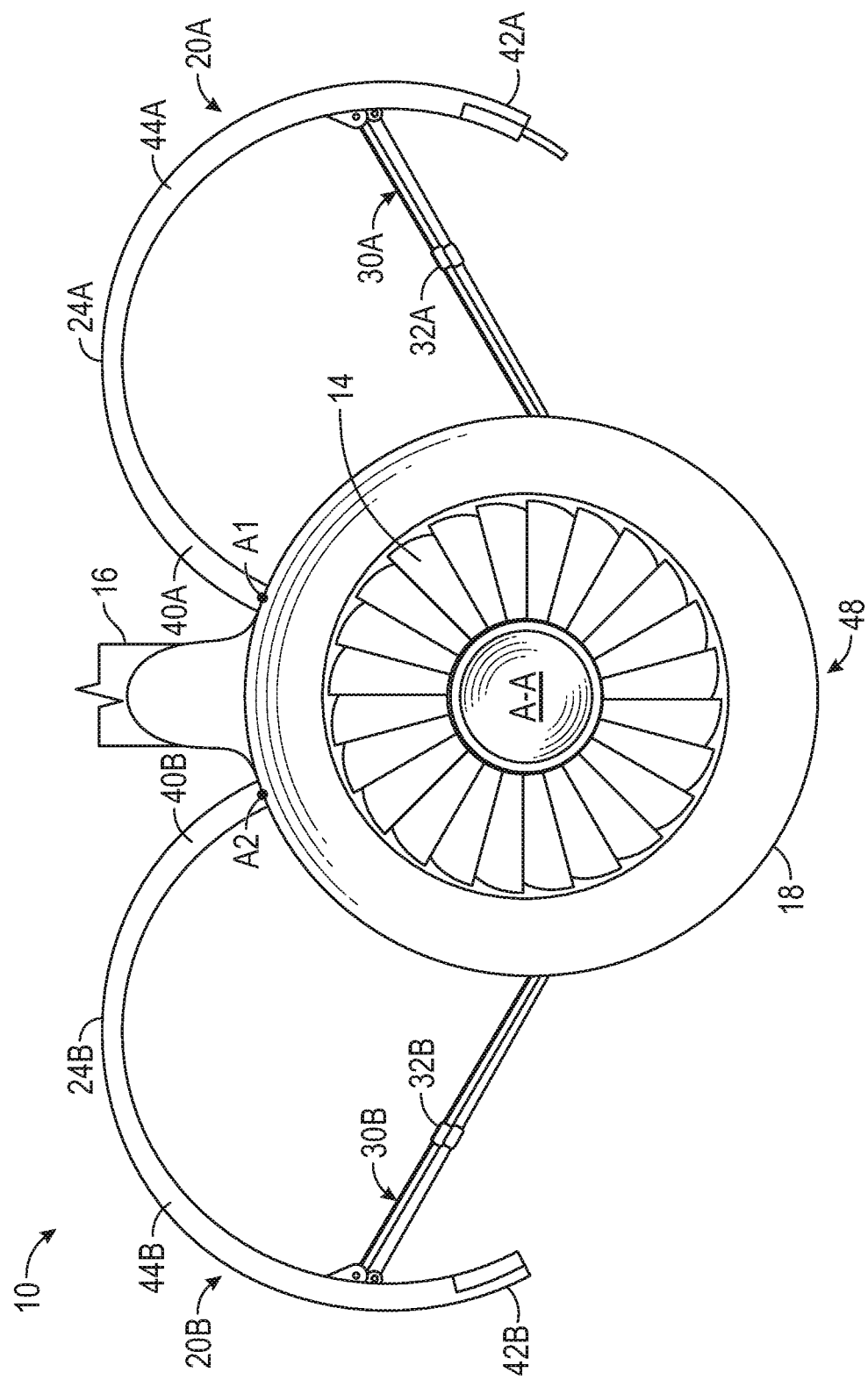
FIG. 2 is a front view of the aircraft nacelle shown in FIG. 1 where a left fan cowl and a right fan cowl of the aircraft nacelle are rotated upwardly about respective axes according to an exemplary embodiment.

Referring to both FIGS. 1 and 2, the fan cowl 20 is bifurcated into two fan cowls 20A, 20B that generally oppose one another with respect to a center axis A-A of the aircraft nacelle 10. Specifically, the fan cowl 20 includes a first fan cowl 20A, which may also be referred to as a right-hand fan cowl, and a second fan cowl 20B, which may also be referred to as a left-hand fan cowl. Both the first fan cowl 20A and the second fan cowl 20B are rotatably mounted to the pylon 16. The first fan cowl 20A is rotatable about a first axis A1 and the second fan cowl 20B is rotatable about a second axis A2. FIG. 1 illustrates the first fan cowl 20A and the second fan cowl 20B is a secured position. When in the secured position, the first fan cowl 20A and the second fan cowl 20B are secured to one another by a latch mechanism 50 (seen in FIG. 3).

As explained below, the latch mechanism 50 is secured into a latched position to prevent the fan cowls 20A, 20B from rotating about their respective axes A1, A2. When the latch mechanism 50 is released into an unlatched position, the fan cowls 20A, 20B are rotatable about their respective axes A1, A2. The fan cowls 20A, 20B are rotatable in an upwards direction towards one another and into an access position as seen in FIG. 2. When the fan cowls 20A, 20B are in the access position seen in FIG. 2, the turbofan engine 12 and other components located within the aircraft nacelle 10 such as, for example, an electric generator (not shown) are exposed and are now accessible to aircraft maintenance personnel. A support rod 30A is provided to support the first fan cowl 20A in the access position. Similarly, a support rod 30B is also provided to support the second fan cowl 20B in the access position as well.

Once maintenance personnel have finished servicing the components within the aircraft nacelle 10, the fan cowls 20A, 20B are rotated downwardly towards one another and back into the secured position as seen in FIG. 1. Both support rods 30A, 30B are configured to collapse about respective hinges 32A, 32B when the fan cowls 20A, 20B are rotated back into the secured position seen in FIG. 1. The support rods 30A, 30B are stored within the interior volume 6 of the aircraft nacelle 10 when the fan cowls 20A, 20B are in the secured position. However, the fan cowls 20A, 20B are still able to rotate about their respective axes A1, A2 unless the latch mechanism is in the latched position to secure the fan cowls 20A, 20B to one another.

Figure 3:
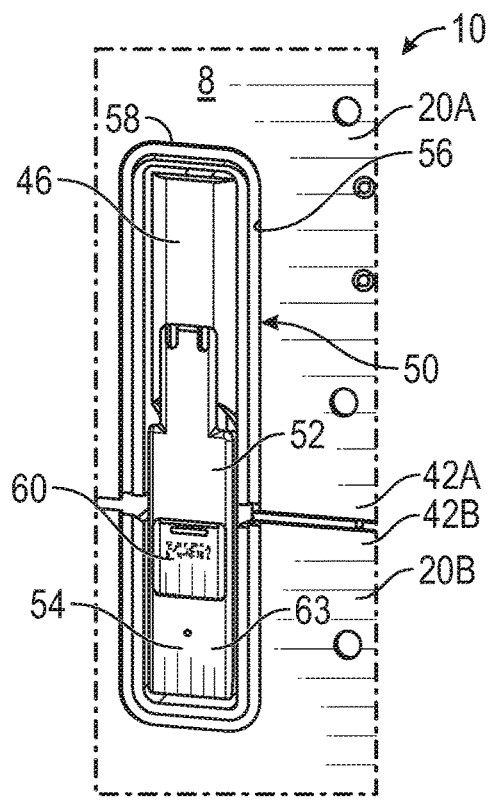
FIG. 3 illustrates a latch mechanism for securing the left fan cowl and the right fan cowl in FIG. 2 to one another according to an exemplary embodiment.

Referring to FIG. 2, the first fan cowl 20A defines a first proximate end 40A and a first distal or free end 42A and the second fan cowl 20B also defines a second proximate end 40B and a second free end 42B. The first fan cowl 20A and the second fan cowl 20B are rotatably mounted to the pylon 16 at their respective proximate ends 40A, 40B. The first free end 42A of the first fan cowl 20A and the second free end 42B of the second fan cowl 20B are secured to one another by the latch mechanism 50 shown in FIG. 3. Referring to FIGS. 1, 2, and 3, the latch mechanism 50 is located along an underside 48 of the aircraft nacelle 10. Since the latch mechanism 50 is located along the underside 48 of the aircraft nacelle 10, an individual 38 (FIG. 1) needs to crouch or bend down to view the latch mechanism 50.

Referring to FIGS. 1 and 2, the first fan cowl 20A and the second fan cowl 20B define at least a portion of the exterior surface 8 of the aircraft nacelle 10 when secured to one another. The first fan cowl 20A includes a profile 44A that is curved or arcuate. Similarly, the second fan cowl includes a second profile 44B that is also arcuate. In the non-limiting embodiment as shown, the first fan cowl 20A and the second fan cowl 20B are substantially symmetrical with respect to the central axis A-A of the aircraft nacelle 10. Furthermore, as seen in FIG. 2, the first profile 44A of the first fan cowl 20A and the second profile 44B of the second fan cowl 20B are substantially semi-circular. Although the first fan cowl 20A and the second fan cowl 20B are illustrated as substantially symmetrical semi-circular components, FIGS. 1 and 2 are exemplary in nature and the first fan cowl 20A and the second fan cowl 20B need not be semi-circular.

FIG. 3 illustrates the latch mechanism 50 in the latched position, where the fan cowls 20A, 20B are secured to one another. The latch mechanism 50 is moveable between the latched position and the unlatched position (seen in FIG. 5). Referring to FIGS. 1, 2, 3, and 5, when in the latched position the latch mechanism 50 secures the first fan cowl 20A and the second fan cowl 20B together into the secured position (FIG. 1). Once the latch mechanism 50 is released into the unlatched position in FIG. 5, the first fan cowl 22A and the second fan cowl 22B are free to rotate about their respective axes A1, A2 and into the access position (seen in FIG. 2). Specifically, when the latch mechanism 50 is released the first fan cowl 22A and the second fan cowl 22B are free to rotate upwardly towards the pylon 16 to expose the turbofan engine 12 and other components housed within the aircraft nacelle 10.

Figure 4:
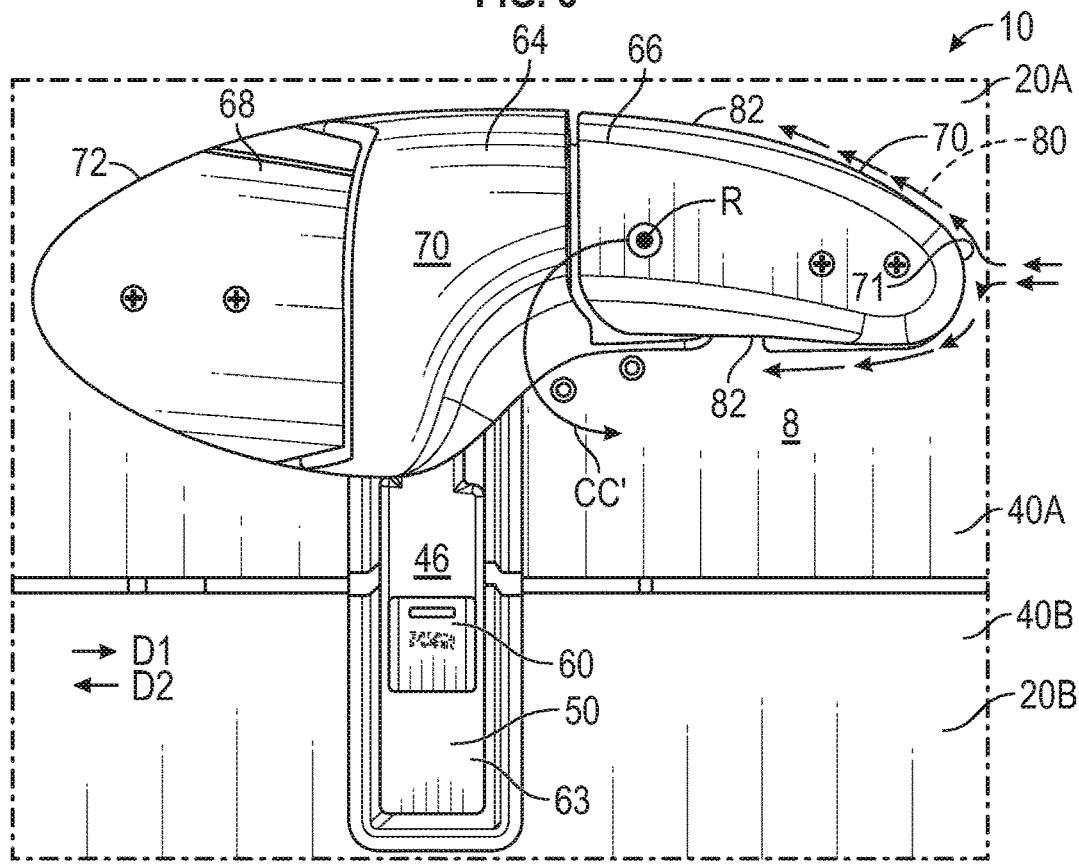
FIG. 4 is an illustration of the latch mechanism shown in FIG. 3 in a latched position and a blade that is in a stowed position according to an exemplary embodiment.
Figure 5:
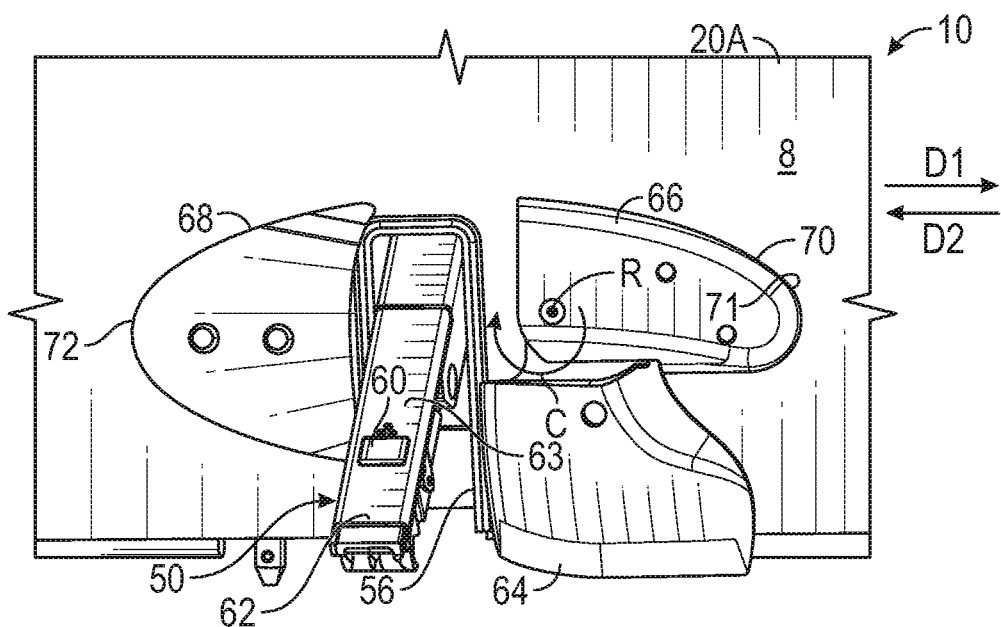
FIG. 5 is an illustration of the latch mechanism and the blade shown in FIG. 4, where latch mechanism is in an unlatched position and the blade is in a deployed position according to an exemplary embodiment.

FIGS. 4 and 5 illustrate a blade 64 located along the exterior surface 8 of the aircraft nacelle 10. Specifically, in the embodiment as illustrated, both the latch mechanism 50 and the blade 64 are both connected to the first fan cowl 20A. The blade 64 has been omitted in FIG. 3 to provide an unobstructed view the latch mechanism 50. Referring now to FIG. 3, a part 52 of the latch mechanism 50 is positioned on the first free end 42A of the first fan cowl 20A and a remaining part 54 of the latch mechanism 50 is positioned on the second free end 42B of the second fan cowl 20B when the latch mechanism 50 is in the latched position. The first free end 42A of the first fan cowl 20 and the second free end 42B of the second fan cowl 20B are substantially contiguous with one another when the latch mechanism 50 is in the latched position. The latch mechanism 50 may be located within a housing 58.

Referring to FIGS. 1, 3 and 5, the first free end 42A of the first fan cowl 20A and the second free end 42B of the second fan cowl 20B cooperate to define an opening 56. The opening 56 is shaped to provide access to the latch mechanism 50. As seen in FIG. 3, an outer surface 46 of the latch mechanism 50 is substantially flush with the exterior surface 8 of the aircraft nacelle 10 when in the latched position. However, when the latch mechanism 50 is in the unlatched position a portion 62 of the latch mechanism 50 (FIG. 5) is positioned to protrude in a direction away from the exterior surface 8 of the aircraft nacelle 10. In other words, the portion of the latch mechanism 50 projects in an outward direction with respect to the exterior surface 8 of the aircraft nacelle 10.

When the individual 38 stoops down to view the underside 48 of the aircraft nacelle 10 (seen in FIG. 1) the latch mechanism 50 is flush with the exterior surface 8 of the aircraft nacelle 10 when the fan cowls 20A, 20B are secured to one another. Accordingly, the latch mechanism 50 and is not visible to the individual 38 when in the latched position. However, when the latch mechanism 50 is in the unlatched position, the portion 62 of the latch mechanism 50 (FIG. 5) that protrudes away the exterior surface 8 of the aircraft nacelle 10 is visible to the individual 38. In one embodiment, the latch mechanism 50 is a hook latch and the portion 62 of the latch mechanism 50 is a handle 63. The hook latch also includes a trigger 60 that is depressed to release the latch mechanism 50 from the latched position into the unlatched position.

FIG. 4 illustrates the blade 64 in a stowed position and FIG. 5 illustrates the blade 64 in a deployed position. The blade 64 is rotatable about an axis of rotation R between the stowed position and the deployed position. Specifically, in the exemplary embodiment as shown the blade 64 rotates about the axis of rotation R in a counterclockwise rotational path CC from the stowed position into the deployed position. Moreover, the blade 64 rotates about the axis of rotation R in a clockwise rotational path C from the deployed position into the stowed position. When the blade 64 is in the stowed position seen in FIG. 4, the latch mechanism 50 is in the latched position. The blade 64 may then rotate about the axis of rotation R along the counterclockwise rotational path CC and into the deployed position shown in FIG. 5.

Once the blade 64 is in the deployed position the latch mechanism 50 is moved into the unlatched position. When the latch mechanism 50 is unlatched the portion 62 of the latch mechanism 50 that protrudes in a direction away from the exterior surface 8 of the aircraft nacelle 10 creates an obstruction. Specifically, the portion 62 of the latch mechanism 50 prevents the blade 64 from rotating in the clockwise rotational path C from the deployed position into the stowed position seen in FIG. 4. In the embodiment as illustrated, the portion 62 of the latch mechanism 50 lies directly in the clockwise rotational path C that the blade 64 follows to rotate back into the stowed position to create an obstruction. The obstruction prevents the blade 64 from rotating about the rotational axis R and into the stowed position. Specifically, if the blade 64 rotates about the rotational axis R in the clockwise rotational path C, the blade 64 eventually abuts against the handle 63 of the latch mechanism 50 and is thereby unable to rotate further in the clockwise direction. However, once the latch mechanism 50 is actuated back into the latched position seen in FIGS. 3 and 4, the handle 63 of the latch mechanism 50 no longer creates an obstruction. Thus, the blade 64 is free to rotate back into the stowed position.

In the exemplary embodiment as shown, the axis of rotation R of the blade 64 is positioned towards the forward direction D1 of an aircraft with respect to the blade 64. A forward fairing 66 and an aft fairing 68 are provided and are positioned along the exterior surface 8 of the aircraft nacelle 10, where the blade 64 is positioned between the forward fairing 66 and the aft fairing 68. The forward fairing 66 is positioned towards the forward direction D1 of an aircraft and makes initial contact with a flow of air 80. The forward fairing 66 and the aft fairing 68 are substantially aligned with respect to the central axis A-A of the aircraft nacelle 10 (FIG. 1). As explained below, the forward fairing 66 and the aft fairing 68 are provided to improve a coefficient of drag $C_D$ associated with the blade 64. Specifically, the forward fairing 66 and the aft fairing 68 include a streamlined or aerodynamic profile for reducing the drag created by the blade 64 when an aircraft is in flight. In some embodiments the forward and aft fairings 66, 68 may be omitted, which in turn increases the coefficient of drag $C_D$ associated with the blade 64.

Referring to FIG. 4, the blade 64, the forward fairing 66, and the aft fairing 68 cooperate with one another to create a single surface 70 that is substantially contiguous when the blade 64 is in the stowed position. In the embodiment as shown, the single surface 70 is shaped as a streamlined profile. A streamlined profile is contoured or rounded and does not generally include sharp corners and is shaped to reduce drag. As a result, the single surface 70 defined by the forward fairing 66, the blade 64, and the aft fairing 68 creates less drag during flight when compared to the drag created by the blade 64 alone (i.e., the forward fairing 66 and the aft fairing 68 are omitted). The forward fairing 66 defines a leading edge 71 and the aft fairing 68 defines a trailing edge 72. The leading edge 71 of the forward fairing 66 is the portion of the single surface 70 that makes initial contact with the flow of air 80 during flight of an aircraft. The leading edge 71 of the forward fairing 66 includes a curved profile 76 shaped to separate the flow of air 80 making initial contact with the leading edge 71 during flight. In one embodiment, the curved profile 76 of the forward fairing 66 defines two side surfaces 82 that are both oriented to further decrease the coefficient of drag $C_D$ associated with the blade 64. Specifically, the side surfaces 82 of the forward fairing 66 are angled to diverge away from one another with respect to the forward direction D1 of the aircraft, which in turn directs the flow of air 80 away from the blade 64.

Figure 6:
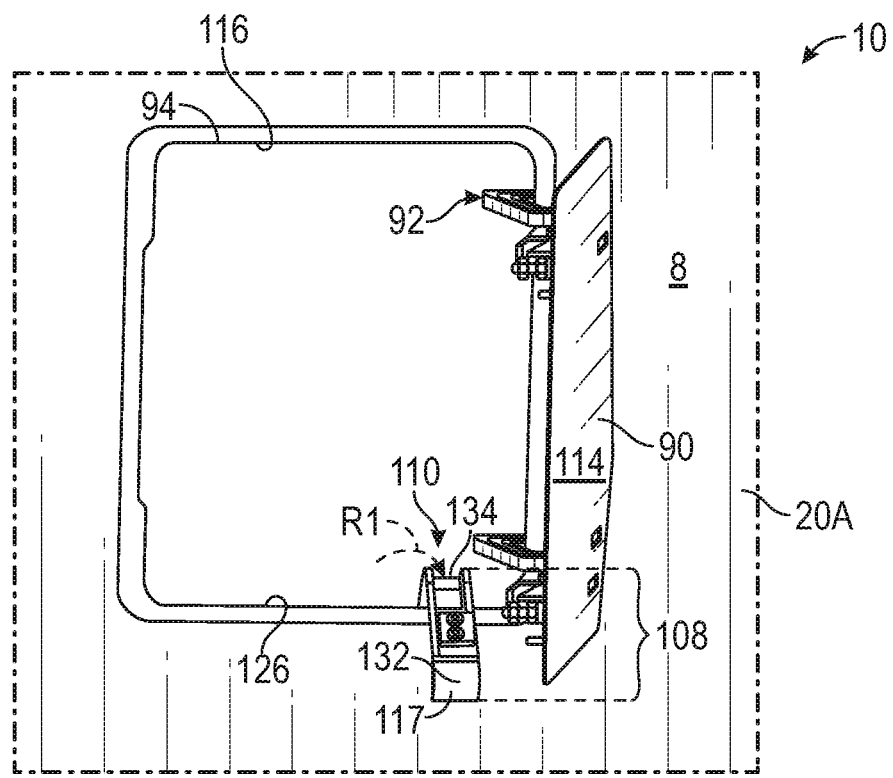
FIG. 6 is an illustration of a door located along an exterior surface of the aircraft nacelle, where the door is in an open position according to an exemplary embodiment.
Figure 7:
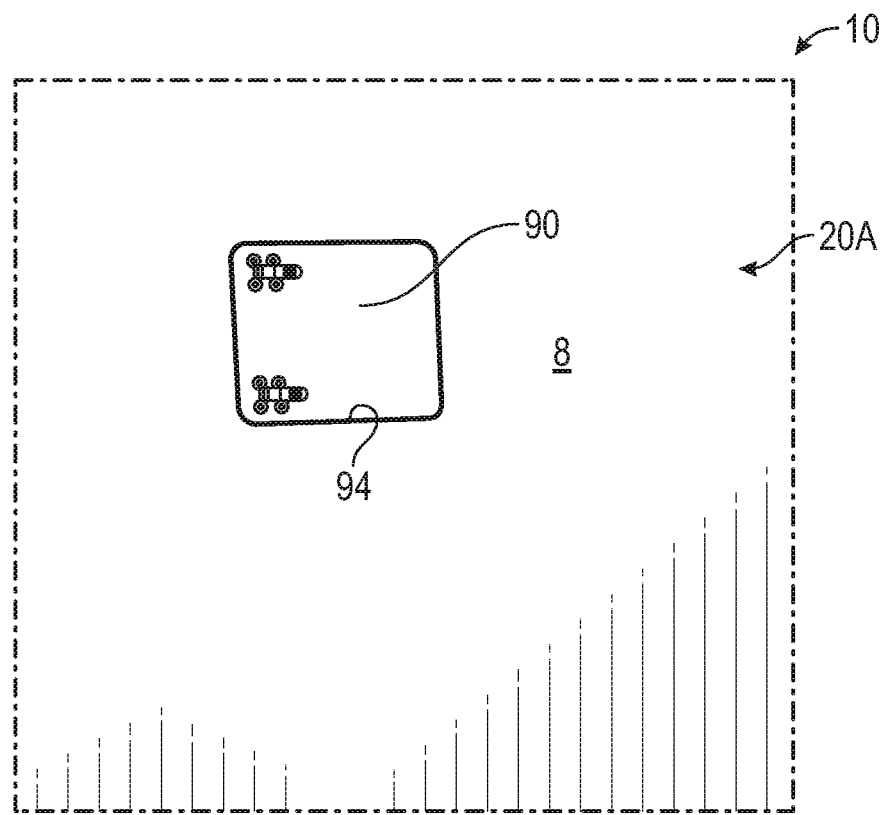
FIG. 7 is an illustration of the door shown in FIG. 6 in the closed position according to an exemplary embodiment.

Referring to FIGS. 1, 5, 6 and 7, a door 90 is positioned along the exterior surface 8 of the aircraft nacelle 10. More specifically, the door 90 is located on the same fan cowl 20A connected to the latch mechanism 50 and the blade 64. The door 90 is rotatable between an open position (shown in FIG. 6) and a closed position (shown in FIGS. 1 and 7). In an embodiment the door 90 may be rotatably connected to the first fan cowl 20A by a hinge mechanism 92 (FIG. 6). As seen in FIG. 6, an opening 94 is defined in the exterior surface 8 of the aircraft nacelle 10. The opening 94 is visible when the door 90 is in the open position. However, as seen in FIGS. 1 and 7, when the door 90 is closed the opening 94 is covered and no longer visible. The door 90 provides access to the turbofan engine 12 or other components (not shown) located within the interior volume 6 of the aircraft nacelle 10. For example, in one embodiment the door 90 may be an Integrated Drive Generator (IDG) access door that is opened by maintenance personnel to check IDG oil levels.

The door 90 and the opening 94 are both positioned along the exterior surface 8 of the aircraft nacelle 10 at an eye level E, which is representative of a line of sight of an individual. In the embodiment as shown in FIG. 1, the individual 38 is of average height and is standing in an upright position. The eye level E is a vertical distance V measured between a ground surface 102 and a line of sight of the individual 38. In an embodiment, the vertical distance V is about 1.5 meters (5 feet), and is based on the average height of men and women combined. As seen in FIG. 1, the door 90 of the aircraft nacelle 10 is substantially aligned with the eye level E when the aircraft (not shown) is grounded. Therefore, when the individual 38 walks towards the aircraft nacelle 10 and stands in front of the door 90, he or she will be able to view the door 90 (and the opening 94 if the door 90 is open) while standing upright. In contrast, the individual 38 needs to stoop or bend underneath the aircraft nacelle 10 to view the latch mechanism 50 (FIG. 3).

Figure 8:
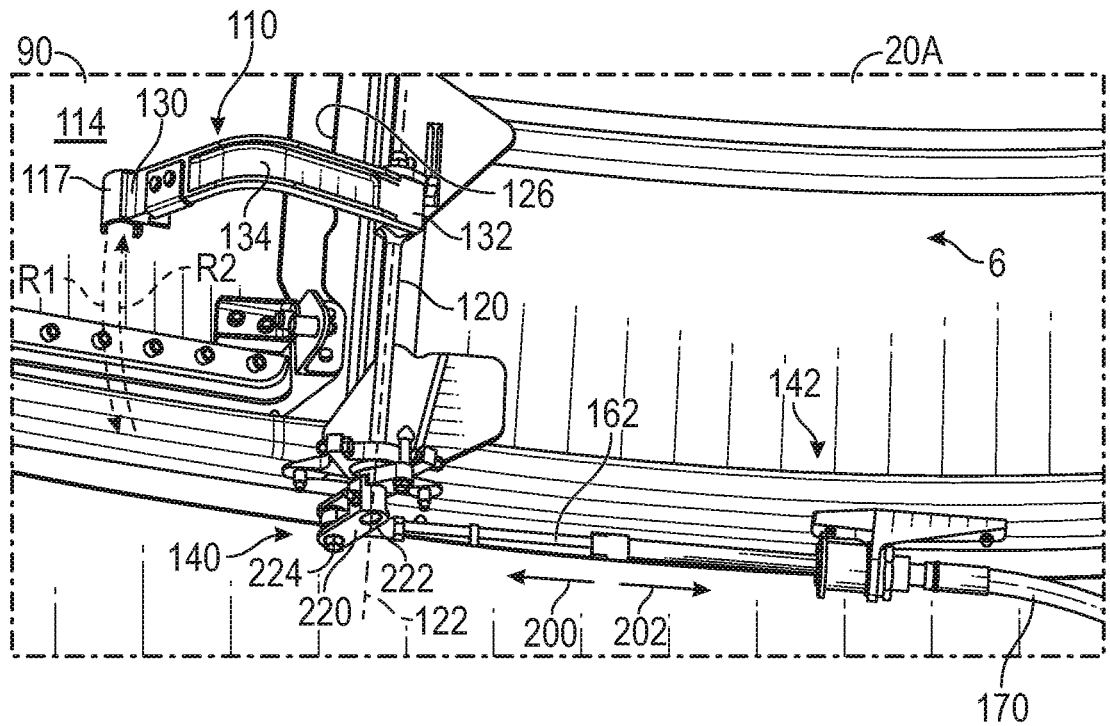
FIG. 8 is an illustration of the interior of the aircraft nacelle with the door in the closed position and an arm abutting against the door according to an exemplary embodiment.

Referring to FIG. 6, the door 90 is in the open position and is unable to rotate about the hinge mechanism 92 into the closed position. Specifically, the door 90 may partially rotate about the hinge mechanism 92, but the door 90 is unable to fully close. The door 90 is unable to close because a portion 108 of an arm 110 extends through the opening 94 located in the exterior surface 8 of the aircraft nacelle 10. The portion 108 of the arm 110 blocks or obstructs the opening 94 in the exterior surface 8 of the aircraft nacelle 10. Referring to FIGS. 6 and 8, because of the obstruction created by the arm 110, an inner or interior surface 114 of the door 90 is unable to abut or seal against an outer periphery 116 of the opening 94.

Referring to FIGS. 6, 7, and 8, the arm 110 is moveable between a stowed position (seen in FIG. 8) where the arm 110 is positioned within the interior volume 6 of the aircraft nacelle 10 and an extended position (seen in FIG. 6) where the portion 108 of the arm 110 obstructs the opening 94 in the exterior surface 8 of the aircraft nacelle 10 to prevent the door 90 from rotating into the closed position (seen in FIG. 7). In the embodiment as illustrated, the arm 110 is rotatable about a shaft 120 (FIG. 8). The shaft 120 is positioned within the interior volume 6 of the aircraft nacelle 10. The shaft 120 is configured to rotate about a longitudinal axis 122 to actuate the arm 110 into the extended position. In the exemplary embodiment as shown, the longitudinal axis 122 of the shaft 120 (FIG. 8) is substantially parallel to a bottom edge 126 of the outer periphery 116 of the opening 94 in the exterior surface 8 of the aircraft nacelle 10 (FIG. 6). The arm 110 rotates about the longitudinal axis 122 of the shaft 120 between the retracted position (seen in FIG. 8) and the extended position (seen in FIG. 6). Specifically, the arm 110 is rotated back and forth about the shaft 120 in a rotational direction 128 that is substantially transverse with respect to the opening 94 located in the exterior surface 8 of the aircraft nacelle 10. Thus, when the shaft 120 rotates in a first direction R1 and towards the opening 94 in the exterior surface 8 of the aircraft nacelle 10, the portion 108 of the arm 110 extends through the opening 94 and into the extended position. Similarly, when the shaft 120 rotates in a second direction R2 and away from the opening 94, the portion 108 of the arm 110 is pulled back into the interior volume 6 of the aircraft nacelle 10 and into the retracted position.

Referring to FIGS. 1, 6, and 8, the arm 110 is stationary and does not move unless an individual manually actuates the arm 110. Specifically, the individual 38 grasps or otherwise holds the arm 110 and exerts a force upon the arm 110 to urge the arm 110 to rotate about the shaft 120 in the first rotational direction R1. The arm 110 is rotated about the shaft 120 from the interior volume 6 and through of the opening 94 in the exterior surface 8 of the aircraft nacelle 10 (i.e., from the stowed position and into the extended position). Alternatively, the individual 38 grasps the arm 110 and exerts a force upon the arm 110 to urge the arm 110 to rotate about the shaft 120 in the second rotational direction R2. Specifically, the arm 110 is rotated back into the interior volume 6 of the aircraft nacelle 10 through the opening 94 in the exterior surface 8 of the aircraft nacelle 10.

In the embodiment as shown in FIGS. 6 and 8, the portion 108 of the arm 110 is shaped as a rounded knob or bumper 117. The arm 110 is shaped to include a first end portion 130, a second end portion 132, and a bend 134 located between the first end portion 130 and the second end portion 132. The bumper 117 is located at the first end portion 130 of the arm 110, and the second end portion 132 of the arm 110 is fixedly attached to the shaft 120. As mentioned above, the shaft 120 is rotatable about the longitudinal axis 122. Accordingly, the arm 110 is configured to rotate about the second end portion 132 of the arm 110 between the stowed position and the extended position.

For example, as seen in FIGS. 6 and 8, the first end portion 130 of the arm 110 protrudes from the opening 94 in the exterior surface 8 of the aircraft nacelle when the arm 110 is in the extended position. The first end portion 130 contacts the interior surface 114 of the door 90 when the arm 110 is in the stowed position and the door 90 is in the closed position. Specifically, the bumper 117 of the arm 110 abuts against the interior surface 114 of the door 90 when in the arm 110 is in the extended position and the door 90 is in the closed position. An individual may open the door 90 and exert a force that urges the arm 110 to rotate in the first rotational direction R1 about the second end portion 132 and into the extended position seen in FIG. 6. The first end portion 130 of the arm 110 projects from the opening 94 in the exterior surface 8 of the aircraft nacelle 10 when the arm 110 is in the extended position. In one embodiment, the bend 134 of the arm 110 is shaped to rest against the bottom edge 126 of the outer periphery 116 of the opening 94 in the exterior surface 8 of the aircraft nacelle 10.

Figure 9:
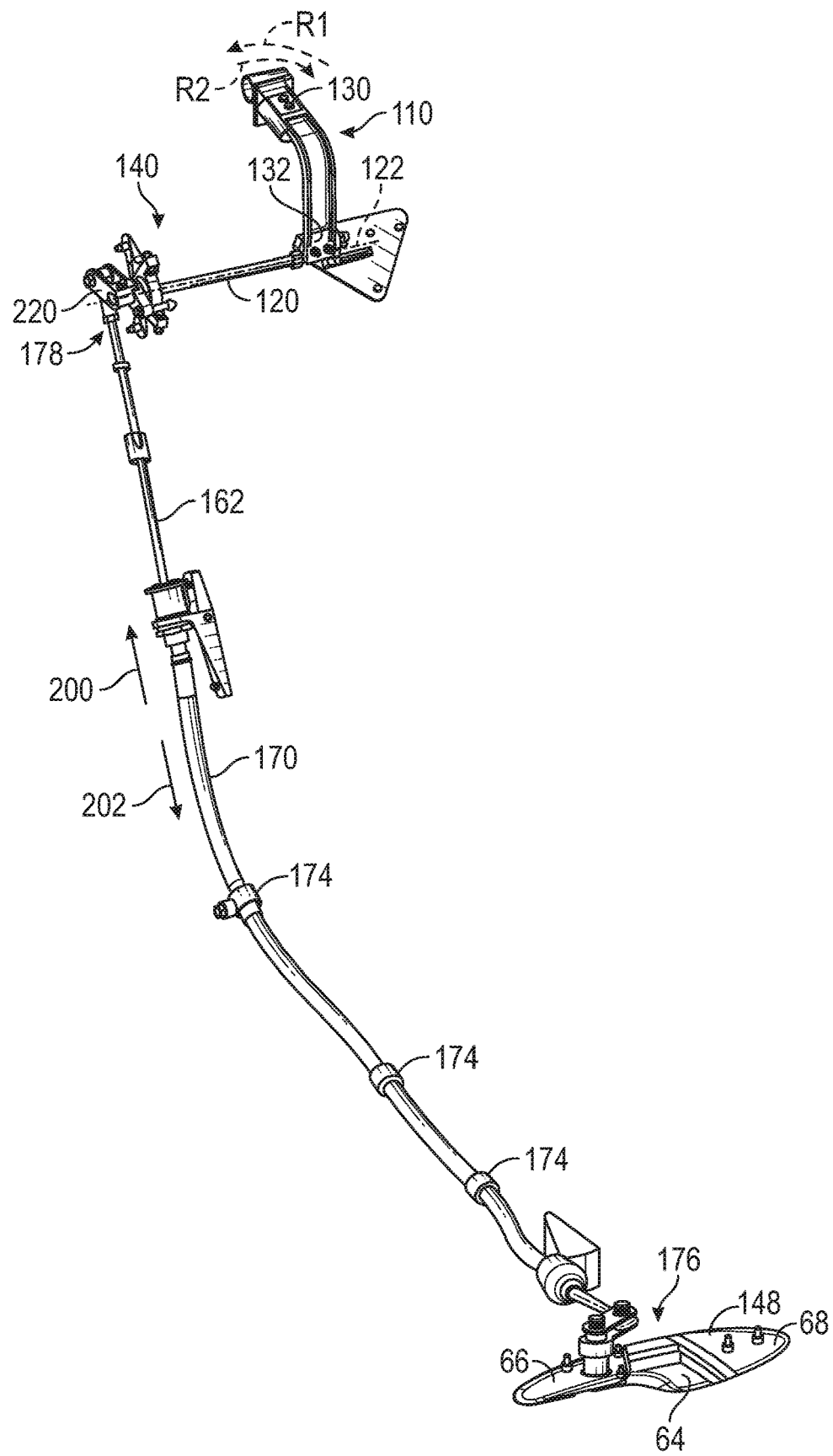
FIG. 9 is an illustration of a linkage assembly for operably connecting the arm shown in FIG. 8 with the blade according to an exemplary embodiment.

FIG. 9 illustrates the arm 110, the shaft 120, a rotational bracket 140, a linkage assembly 142, the blade 64, the forward fairing 66, and the aft fairing 68. The first fan cowl 20A is omitted from FIG. 9 for purposes of clarity and simplicity. Since the first fan cowl 20A is not visible in FIG. 9, an underside 148 of the blade 64, the forward fairing 66, and the aft fairing 68 are visible. FIG. 11 is an enlarged view of a portion of the interior volume 6 of the aircraft nacelle 10 including the housing 58 containing the latch mechanism 50, a portion of the linkage assembly 142, and an actuator 150 that rotates the blade 64 between the stowed position and the deployed position. As explained below, the linkage assembly 142 operably connects the arm 110 to the blade 64, where the arm 110 is unable to move from the extended position into the retracted position when the blade 64 is in the deployed position and the latch mechanism 50 is in the unlatched position.

Figure 10:
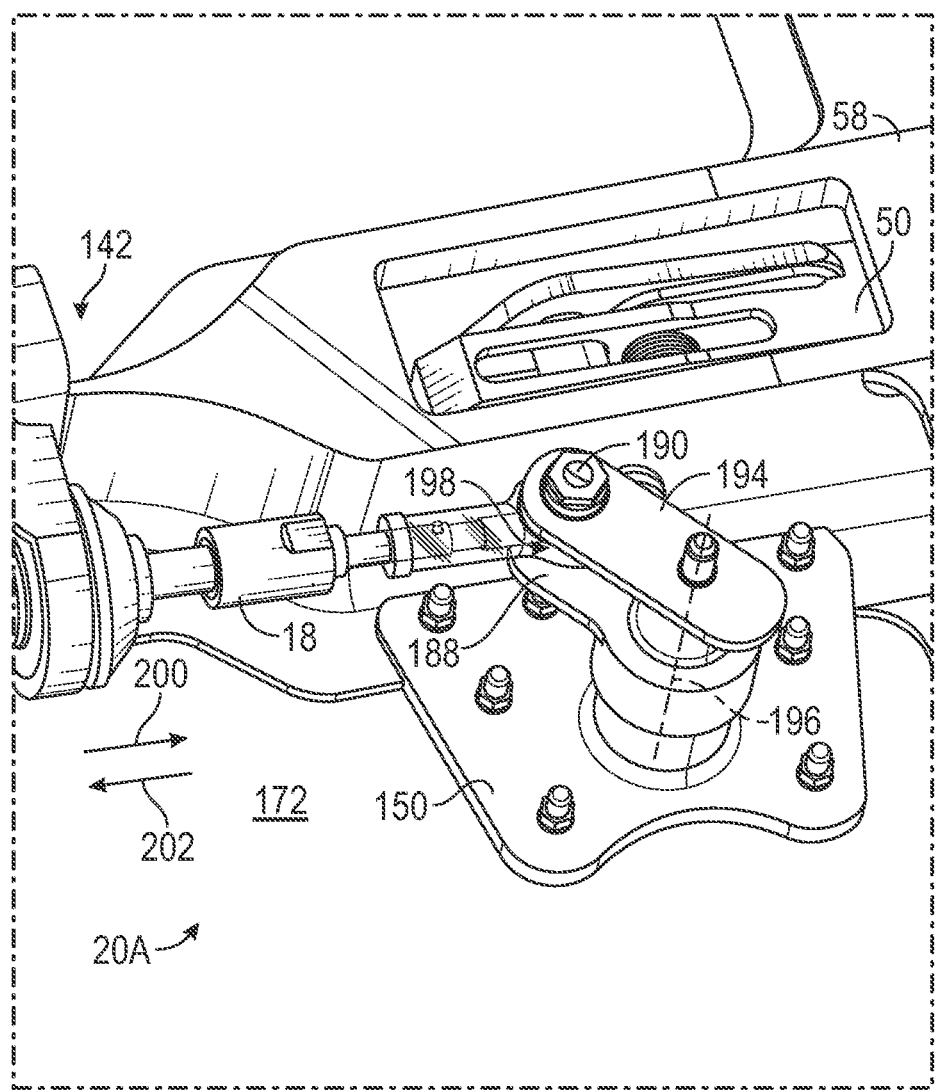
FIG. 10 illustrates a portion of the linkage assembly and the blade within the interior of the aircraft nacelle according to an exemplary embodiment.

Referring to FIGS. 8, 9, and 10, the linkage assembly 142 includes the arm 110, the shaft 120, the rotational bracket 140, the actuator 150 for rotating the blade 64, and a cable 162. The cable 162 may be routed through a conduit 170, where the conduit 170 is attached to an inner surface 172 of the first fan cowl 20A by a plurality of fasteners 174. The cable 162 defines a first end portion 176 operably connected to the blade 64 and a second end portion 178 operably connected to the arm 110. In the exemplary embodiment as illustrated, the first end portion 176 of the cable 162 may be connected to a bracket 186. The bracket 186 connects the first end portion 176 of the cable 162 to the actuator 150. The bracket 186 includes a fitting 188 that defines an aperture (not visible in the figures). The aperture of the fitting 188 is shaped to receive a shaft 190 of the actuator 150. Specifically, the shaft 190 is part of a rotational lever 194 of the actuator 150. The lever 194 includes a fulcrum 196 and a free end 198, where the shaft 190 is positioned at the free end 198 of the lever 194. The lever 194 rotates about the fulcrum 196.

Referring to FIGS. 4, 5, 9, and 10, the lever 194 controls rotation of the blade 64. Specifically, the fulcrum 196 of the lever 194 corresponds to the axis of rotation R of the blade 64. In other words, when the lever 194 rotates in a clockwise direction about the fulcrum 196 the blade 64 also rotates about the axis of rotation R in concert with the rotation of the lever 194. In the embodiment as shown in FIG. 10, the position of the lever 194 corresponds to the blade 64 in the deployed position (seen in FIG. 5).

The lever 194 is actuated about the fulcrum 196 by linear movement of the cable 162. Specifically, referring to FIGS. 6, 8 and 9, the cable 162 is urged in a first direction 200 towards the door 90 as the arm 110 is rotated about the longitudinal axis 122 of the shaft 120 in the first rotational direction R1. In other words, the cable is pulled in the first direction 201 towards the door 90 as the arm 110 is rotated about the second end portion 132 from the stowed position into the extended position. Similarly, the cable 162 is urged in a second direction 202 that opposes the first direction 201 as the arm 110 is rotated about the longitudinal axis 122 of the shaft 120 in the second rotational position R2, which is away from the door 90. In other words, the cable 162 is pulled in a direction away from the door 90 as the arm 110 rotates from the extended position into the retracted position.

In the embodiment as shown in FIG. 10, the lever 194 is positioned to correspond with the arm 110 being in the extended position (FIG. 6) and the blade 64 in the deployed position (FIG. 5). As the cable 162 is urged in second direction 202 a force sufficient to rotate the lever 194 about the fulcrum 196 is exerted on the free end 198 of the lever. Specifically, the force is sufficient to rotate the lever 194 in a clockwise direction about the fulcrum 196. Rotation of the lever 194 about the fulcrum 196 in the clockwise direction causes the blade 64 (FIGS. 4 and 5) to rotate about the axis of rotation R from the deployed position into the stowed position. Although the figures illustrate the cable 162 and the lever 194 for rotating the blade 64, it is to be appreciated that the figures are exemplary in nature and other mechanisms may be used as well.

Referring now to FIGS. 8 and 9, the rotational bracket 140 is connected to the shaft 120 and is configured to rotate the shaft 120 about the longitudinal axis 122. The rotational bracket 140 includes a lever 220 connected to both the cable 162 and the shaft 120. Specifically, a free end 222 of the lever 220 is connected to the second end portion 178 and the shaft 120 is connected to a fulcrum 224 of the lever 220. Thus, when the cable 162 is urged in the first direction 200 the lever 220 is rotated upwardly about the fulcrum 224, which causes the shaft 120 to rotate about the longitudinal axis 122. Specifically, the shaft 120 is rotated so that the arm 110 is rotated about the second end portion 132 in the first rotational direction R1 from the stowed position into the extended position. Likewise, when the cable 162 is urged in the second direction D2 the lever 220 rotates about the fulcrum 224 downwardly, which in turn causes the shaft 120 to rotate the arm 110 into the second rotational direction R2 and from the extended position into the stowed position.

FIG. 11 is a chart that lists the position of the latch mechanism 50, the blade 64, the arm 110, and the door 90 at three different states. Specifically, the three states listed in FIG. 11 are position 1, position 2, and position 3. Referring generally to FIGS. 2, 4, 5, 6, 7, 8, and 11, in position 1 the latch mechanism 50 is in the latched position, the blade 64 is in the stowed position, the arm 110 is in the retracted position, and the door 90 is in the closed position. Position 1 occurs when the first fan cowl 20A and the second fan cowl 20B are secured to one another. For example, Position 1 occurs prior to takeoff or during flight of an aircraft.

In position 2, the latch mechanism 50 is in the latched position, the blade 64 is in the deployed position (but may rotate back into the stowed position), the arm 110 is in the extended position (but may be urged back into the retracted position), and the door 90 is open. Before an operator performs service procedures on components located within the aircraft nacelle 10 the latch mechanism 50 needs to be released. However, before the latch mechanism 50 is released the operator first opens the door 90 and pulls the arm 110 from the interior volume 6 of the aircraft nacelle 10 into the extended position seen in FIG. 6, which corresponds to position 2 in FIG. 11.

Finally, once the operator unlatches the latch mechanism 50 into the unlatched position (FIG. 5) position 3 occurs. In position 3, the arm 110 is unable to be pushed or otherwise urged back into the interior volume of the aircraft nacelle 10. The first fan cowl 20A and the second fan cowl 20B may now be rotated about their respective axes A1, A2 and into the access position as seen in FIG. 2.

Figure 12:
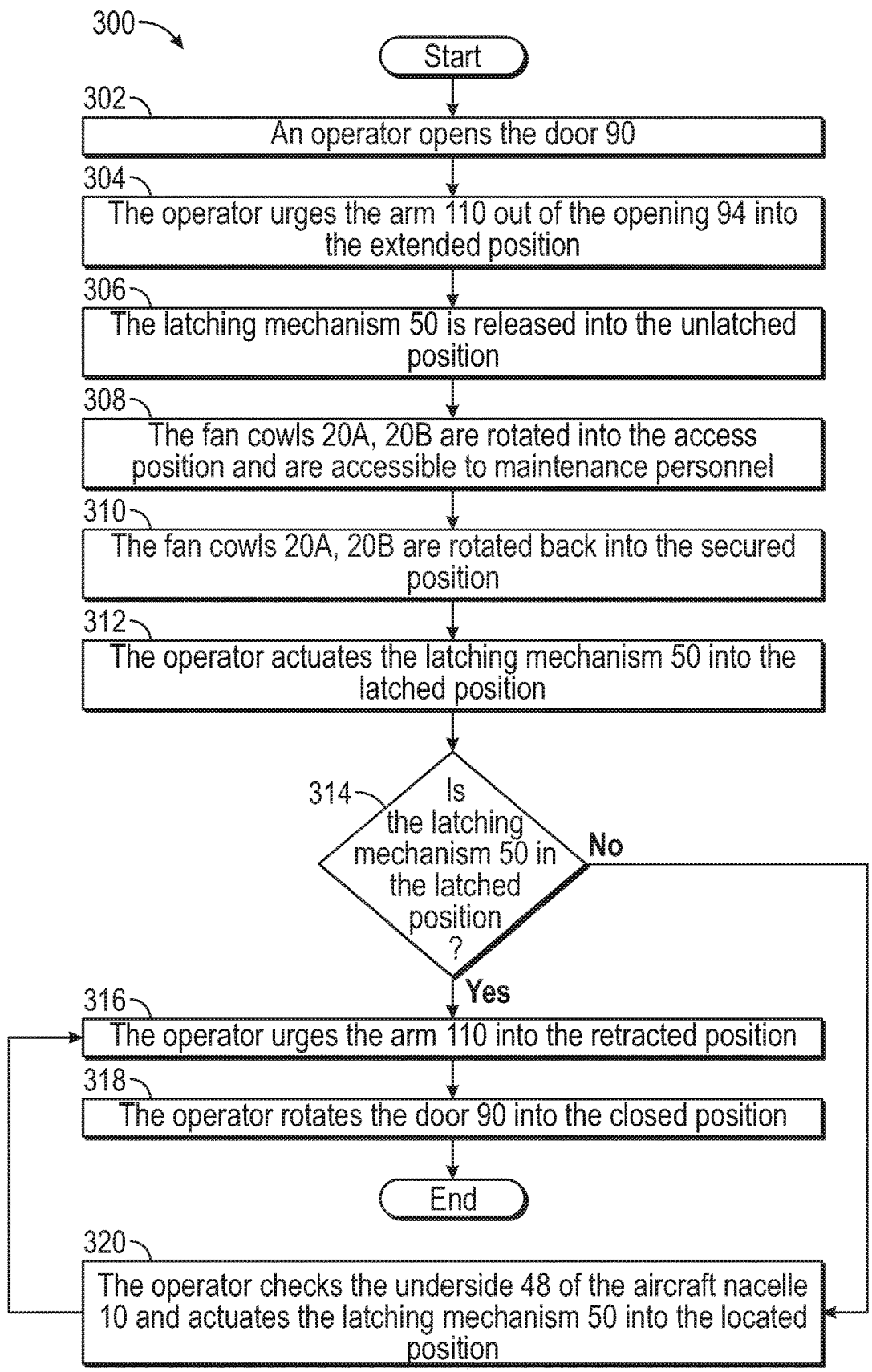
FIG. 12 is a process flow diagram illustrating an exemplary method for actuating the latch mechanism according to an exemplary embodiment.

Turning now to FIG. 12, an exemplary process flow diagram is shown including an exemplary method 300 for actuating the latch mechanism 50. Specifically, the method 300 is for verifying that the latch mechanism 50 is in the latched position (FIG. 3). The operator verifies the position of the latch mechanism 50 by urging the arm 110 back into the aircraft nacelle 10 and then rotating the door 90 back into the closed position (FIG. 7). Referring now to FIGS. 1, 6, 7, 8, and 12, the method 300 begins at block 302. In block 302 the operator opens the door 90. Specifically, the door 90 is rotated from the closed position in FIG. 7 into the open position as seen in FIG. 6. The method 300 may then proceed to block 304.

In block 304, the operator grasps the arm 110 and pulls the arm 110 out of the interior volume 6 of the aircraft nacelle 10, through the opening 94 in the exterior surface 8 of the aircraft nacelle 10, and into the extended position as seen in FIG. 6. In other words, the operator urges the arm 110 from the retracted position (FIG. 8) where the arm 110 is positioned within the interior volume 6 of the aircraft nacelle 10 into an extended position where the portion 108 of an arm 110 obstructs the opening 94 in the exterior surface 8 of the aircraft nacelle 10. In other words, the arm 110 prevents the door 90 from rotating about the hinge mechanism 92 and back into the closed position.

As explained above, urging the arm 110 into the extended position rotates the blade 64 located along the exterior surface 8 of the aircraft nacelle 10 from the stowed position (FIG. 4) into the deployed position (FIG. 5). This is possible because the blade 64 is operatively connected to the arm 110 and is rotated into the deployed position as the arm 110 is pulled from the retracted position into the extended position. The method 300 may then proceed to block 306.

Referring to FIGS. 1-5 and 12, in block 306 the operator releases the latch mechanism 50 located along the underside 48 of the aircraft nacelle 10. Specifically, the operator releases the latch mechanism 50 from the latched position into the unlatched position. The first fan cowl 20A and the second fan cowl 20B of the aircraft nacelle 10 are rotatable about respective axes A1, A2 when the latch mechanism 50 is in the unlatched position. Furthermore, as mentioned above, the blade 64 is unable to rotate back into the deployed position shown in FIG. 4 when the latch mechanism 50 is in the unlatched position. The method 300 may then proceed to block 308.

Referring to FIGS. 1-2 and 12, in block 308 the operator rotates the first fan cowl 20A about the first axis A1 and the second fan cowl 20B about the second axis A2 upwardly from the secured position seen in FIG. 1 into the access position seen in FIG. 2. When the first fan cowl 20A and the second fan cowl 20B are in the access position, the turbofan engine 12 and other components located within the aircraft nacelle 10 are now accessible to aircraft maintenance personnel. Once maintenance personnel have finished servicing the components within the aircraft nacelle 10 the method 300 may then proceed to block 310.

In block 310, the first fan cowl 20A and the second fan cowl A2 are towards one another until the first free end 40A of the first fan cowl 20A is substantially contiguous with a second free end 40B of the second fan cowl 20B. In other words, the fan cowls 20A, 20B are rotated back into the secure position seen in FIG. 1. The method 300 may then proceed to block 312.

Referring to FIGS. 3, 4, and 5, in block 312 the operator actuates the latch mechanism 50 from the unlatched position into the latched position to secure the first fan cowl 20A and the second fan cowl 20B together. Referring to FIG. 5, when the latch mechanism 50 is actuated back into the latched position this in turn moves the portion 108 of the latch mechanism 50 that obstructs a path of movement of the blade 64 (e.g., the clockwise rotational path C). The method 300 may then proceed to decision block 314.

Decision block 314 determines whether the latch mechanism 50 is in the latched position shown in FIG. 3 or in the unlatched position seen in FIG. 5. This is because an operator may inadvertently forget to secure the fan cowls 20A, 20B together by actuating the latch mechanism 50 back into the latched position. In the event the latch mechanism 50 is in the latched position, then method 300 may proceed to block 316.

Referring to FIGS. 1,4-7, and 12, in block 316 the operator urges the arm 110 from the extended position into the retracted position. The blade 64 is rotated about the path of movement from the deployed position back into the stowed position as the arm 110 is urged into the retracted position. The method may then proceed to block 318.

In block 318, the operator rotates the door 90 located along the exterior surface 8 of the aircraft nacelle 10 into the closed position. The opening 94 in the exterior surface 8 of the aircraft nacelle 10 is concealed when the door 90 is in the closed position. The method 300 may then terminate.

Returning to the decision block 314, in the event the latch mechanism 50 is not in the latched position seen in FIG. 3, then the method 300 may proceed to block 320. In block 320 the operator attempts to urge the arm 110 from the extended position seen in FIG. 6 and into the retracted position. However, the operator is unable to move the arm 110 back into the retracted position. The method 300 may then proceed to block 322.

In block 322, the operator then stoops or bends down to view the underside 48 of the aircraft nacelle 10 and sees the latch mechanism 50 in the unlatched position. The operator then moves the latch mechanism 50 into the latched position. The method may then continue at block 316.

Figure 13:
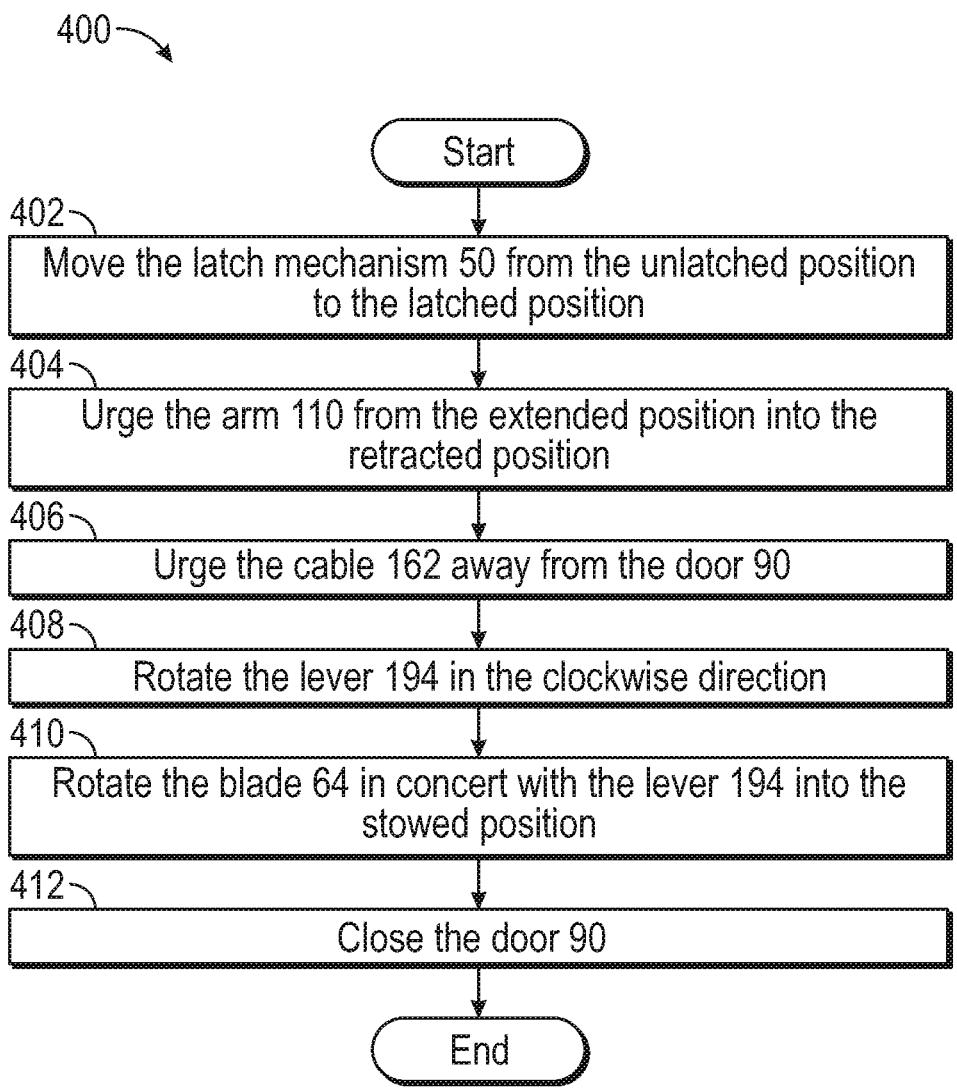
FIG. 13 is a process flow diagram illustrating an exemplary method for securing the latch mechanism into the latched position.

Turning now to FIG. 13, a process flow diagram illustrates an exemplary method 400 of rotating the door 90 located along the exterior surface 8 of the aircraft nacelle 10 into the closed position to verify the latch mechanism 50 is engaged. Referring generally to FIGS. 1-11 and 13, the method 400 begins at block 402. In block 402, the latch mechanism 50 is moved from the unlatched position into the latched position to secure the first fan cowl 20A and the second fan cowl 20A to one another. Referring specifically to FIGS. 5 and 6, moving the latch mechanism 50 from the unlatched position (FIG. 4) into the latched position (FIG. 5) removes the portion 108 of the latch mechanism 50 that obstructs the path of movement of the blade 64. The method 400 may then proceed to block 404.

In block 404, the arm 110 is urged from the extended position into the retracted position within the interior volume 6 of the aircraft nacelle 10 by rotating about the longitudinal axis 122 of the shaft 120 in the second rotational direction R2 (FIG. 8). As seen in FIG. 6, the portion of the arm extends through the opening in the exterior surface of the aircraft nacelle when the arm 110 is in the extended position. The method 400 may then proceed to block 406.

In block 406, as the arm 110 rotates about the longitudinal axis 122 of the shaft 120, the cable 162 is urged in a direction away from the door 90 (i.e., the second direction 202). The method 400 may then proceed to block 408.

Referring specifically to FIGS. 10 and 12, in block 408 as the cable 162 is urged in a direction away from the door 90 a force sufficient to rotate the lever 194 about the fulcrum 196 is exerted on the free end 198 of the lever. Accordingly, the lever 194 rotates about the fulcrum 196 in the clockwise direction. The method 400 may then proceed to block 410.

Referring specifically to FIGS. 4, 5, and 10, as the lever 194 rotates about the fulcrum 196 the blade 64 rotates in concert with the lever 194 about the axis of rotation R from the deployed position into the stowed position. The method 400 may then proceed to block 412.

In block 412, the arm 110 is in the stowed position seen in FIG. 8. Accordingly, the door 90 may be closed by the operator. Specifically, the operator rotates the door 90 from the open position into the closed position. The method 400 may then terminate.

Referring generally to the figures, technical effects and benefits of the disclosed aircraft nacelle include a mechanism for indicating the fan cowls are not secured to one another by the latch mechanism. The mechanism provides high visibility since the door is located at eye level along the aircraft nacelle. In contrast, the latch mechanism is located along an underside of the nacelle. Therefore, aircraft personnel may need to crouch underneath the nacelle to view the latch mechanism. However, aircraft personnel may view the door when they walk around the aircraft in an upright position. The door remains in the open position when the latch mechanism is in the unlatched position. Accordingly, aircraft personnel may confirm the position of the latch mechanism by attempting to move the arm into the stowed position to close the door.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A nacelle of an aircraft, the nacelle having a center axis, an interior volume, and an exterior surface, the nacelle comprising:
   a first fan cowl, rotatable about a first axis and having an exterior surface, wherein an opening is defined in the exterior surface of the first fan cowl;
   a second fan cowl, rotatable about a second axis, wherein the first axis of the first fan cowl is parallel to the second axis of the second fan cowl;
   a blade, located along the exterior surface of the nacelle on the first fan cowl and movable along a path of movement between a stowed position and a deployed position;
   a latch mechanism, movable between a latched position, where the first fan cowl and the second fan cowl are secured to one another, and an unlatched position, where a portion of the latch mechanism obstructs the path of movement of the blade;
   an arm movable between a retracted position, where the arm is positioned within the interior volume of the nacelle, and an extended position, where a portion of the arm extends through the opening in the exterior surface of the first fan cowl;
   a linkage assembly, operably connecting the arm to the blade, wherein the arm is unable to move from the extended position into the retracted position when the blade is in the deployed position and the latch mechanism is in the unlatched position; and
   a door, rotatable between an open position and a closed position,
   wherein:
      the opening in the exterior surface of the first fan cowl is visible when:
         the door is in the open position,
         the aircraft is parked on a ground surface, and
         the door is viewed along an axis that is parallel to the ground surface and that is perpendicular to the center axis of the nacelle, and
      the portion of the arm prevents the door from rotating into the closed position when the arm is in the extended position.

2. The nacelle of claim 1, wherein an uppermost edge of the door is positioned a vertical distance of 1.5 meters from the ground surface.

3. The nacelle of claim 1, wherein:
   the linkage assembly comprises a shaft, having a longitudinal central axis, connected to the arm, and
   the shaft is configured to rotate about the longitudinal central axis of the shaft to actuate the arm into the extended position.

4. The nacelle of claim 3, wherein the linkage assembly comprises a cable, having a first end portion that is connected to the latch mechanism and a second end portion that is connected to the shaft.

5. The nacelle of claim 1, wherein a first free end of the first fan cowl and a second free end of the second fan cowl are substantially contiguous with each other when the latch mechanism is in the latched position.

6. The nacelle of claim 5, wherein:
   a part of the latch mechanism is positioned on the first free end of the first fan cowl,
   a remaining part of the latch mechanism is positioned on the second free end of the second fan cowl, and
   the latch mechanism is located on an underside of the nacelle.

7. The nacelle of claim 1, wherein:
   the arm comprises a first end portion, a second end portion, and a bend, and
   the bend is located between the first end portion and the second end portion.

8. The nacelle of claim 7, wherein:
   the first end portion of the arm contacts the door when the arm is in the stowed position, and
   the first end portion of the arm protrudes from the opening in the exterior surface of the first fan cowl when the arm is in the extended position.

9. The nacelle of claim 7, wherein the arm rotates about the second end portion of the arm between the stowed position and the extended position.

10. The nacelle of claim 1, further comprising a forward fairing and an aft fairing, positioned along the exterior surface of the nacelle, wherein the blade is positioned between the forward fairing and the aft fairing.

11. The nacelle of claim 10, wherein:
   the forward fairing defines a leading edge that makes initial contact with a flow of air during flight of the aircraft, and the leading edge of the forward fairing comprises a curved profile, shaped to separate the flow of air that comes into the initial contact with the leading edge during the flight of the aircraft.

12. The nacelle of claim 10, wherein the blade, the forward fairing, and the aft fairing cooperate with one another to create a single surface that is substantially contiguous when the blade is in the stowed position.

13. A method for actuating a latch mechanism of a nacelle of an aircraft, the method comprising:
 moving an arm from a retracted position, in which the arm is located within an interior volume of the nacelle, into an extended position, in which a portion of the arm prevents a door from rotating into a closed position, wherein the door is located along an exterior surface of the nacelle;
 rotating a blade, located along the exterior surface of the nacelle from a stowed position to a deployed position, wherein the blade is operatively connected to the arm and is rotated into the deployed position as the arm is moved from the retracted position into the extended position;
 releasing the latch mechanism from a latched position into an unlatched position, wherein a first fan cowl and a second fan cowl of the nacelle are rotatable about their respective axes when the latch mechanism is in the unlatched position; and
 preventing the blade from rotating, along a path of movement, back into the stowed position, wherein a portion of the latch mechanism obstructs the path of movement of the blade.

14. The method of claim 13, further comprising:
 moving the latch mechanism from the unlatched position into the latched position to secure the first fan cowl and the second fan cowl together, wherein the portion of the latch mechanism is located directly in the path of movement of the blade to prevent the blade from rotating, and moving the latch mechanism from the unlatched position into the latched position removes the portion of the latch mechanism from the path of movement of the blade.

15. The method of claim 14, further comprising:
 moving the arm from the extended position into the retracted position;
 rotating the blade from the deployed position back into the stowed position as the arm is moving into the retracted position; and
 rotating the door into a closed position, wherein an opening in the exterior surface of the nacelle is concealed when the door is in the closed position and when the door is viewed along an axis that is parallel to a ground surface, on which the aircraft is parked, and that is perpendicular to a center axis of the nacelle.

16. A method of rotating a door, located along an exterior surface of a nacelle of an aircraft, into a closed position to verify a latch mechanism is engaged, the method comprising:
 moving the latch mechanism from an unlatched position into a latched position;
 moving an arm from an extended position into a retracted position within an interior volume of the nacelle, wherein a portion of the arm extends through an opening in the exterior surface of the nacelle when the arm is in the extended position and prevents the door from rotating into the closed position;
 rotating a blade from a deployed position into a stowed position, wherein the blade is operatively connected to the arm and a portion of the latch mechanism obstructs a path of movement of the blade when the latch mechanism is in the unlatched position; and
 rotating the door from an open position into the closed position, wherein the opening in the exterior surface of the nacelle is concealed when the door is in the closed position and is viewed along an axis that is parallel to a ground surface, on which the aircraft is parked, and perpendicular to a center axis of the nacelle.

17. The method of claim 16, further comprising:
 urging a cable in a direction away from the door, wherein the cable has a first end portion, connected to the blade, and a second end portion, connected to the arm.

18. The method of claim 17, further comprising:
 rotating a lever about a fulcrum as the cable is urged in the direction away from the door, wherein urging the cable creates a force that rotates the lever about the fulcrum; and
 rotating the blade in concert with the lever from the deployed position into the stowed position, wherein the lever and the cable are a part of a linkage assembly operatively connecting the blade and the arm.

19. An aircraft nacelle, having an interior volume and an exterior surface, the aircraft nacelle comprising:
 a first fan cowl, rotatable about a first axis, wherein an opening is located in the exterior surface of the first fan cowl;
 a second fan cowl, rotatable about a second axis, wherein the first axis of the first fan cowl is parallel to the second axis of the second fan cowl;
 a blade, located along the exterior surface of the aircraft nacelle on the first fan cowl and movable along a path of movement between a stowed position and a deployed position;
 a latch mechanism, movable between a latched position, where the first fan cowl and the second fan cowl are secured to each other, and an unlatched position, where a portion of the latch mechanism obstructs the path of movement of the blade;
 an arm, movable between a retracted position, where the arm is positioned within the interior volume of the aircraft nacelle, and an extended position, where a portion of the arm extends through the opening in the exterior surface of the first fan cowl; and
 a linkage assembly, connecting the arm to the blade, wherein:
  the arm is unable to move from the extended position into the retracted position when the blade is in the deployed position and when the latch mechanism is in the unlatched position,
  the linkage assembly comprises a shaft, connected to the arm, and
  the shaft has a longitudinal central axis and is configured to rotate about the longitudinal central axis to actuate the arm into the extended position.

20. The aircraft nacelle of claim 19, wherein the linkage assembly further comprises a cable, comprising:
 a first end portion, connected to the latch mechanism; and
 a second end portion, connected to the shaft.

21. An aircraft nacelle, having an interior volume and an exterior surface, the aircraft nacelle comprising:
 a first fan cowl, rotatable about a first axis, wherein an opening is located in the exterior surface of the first fan cowl;
 a second fan cowl, rotatable about a second axis, wherein the first axis of the first fan cowl is parallel to the second axis of the second fan cowl;

a blade, located along the exterior surface of the aircraft nacelle on the first fan cowl and movable along a path of movement between a stowed position and a deployed position;

a latch mechanism, movable between a latched position, where the first fan cowl and the second fan cowl are secured to each other, and an unlatched position, where a portion of the latch mechanism obstructs the path of movement of the blade;

an arm, movable between a retracted position, where the arm is positioned within the interior volume of the aircraft nacelle, and an extended position, where a portion of the arm extends through the opening in the exterior surface of the first fan cowl, wherein the arm comprises a first end portion, a second end portion, and a bend, located between the first end portion and the second end portion; and a linkage assembly, connecting the arm to the blade, wherein the arm is unable to move from the extended position to the retracted position when the blade is in the deployed position and when the latch mechanism is in the unlatched position.

22. The aircraft nacelle of claim 21, wherein the first end portion of the arm contacts a door when the arm is in the stowed position and protrudes from the opening in the exterior surface of the first fan cowl when the arm is in the extended position.

23. The aircraft nacelle of claim 21, wherein the arm rotates about the second end portion of the arm between the stowed position and the extended position.

\* \* \* \* \*